(12) United States Patent
Best et al.

(10) Patent No.: US 7,311,328 B2
(45) Date of Patent: Dec. 25, 2007

(54) INSTRUMENT PANEL SUBASSEMBLY INCLUDING A GLOVE BOX DOOR

(75) Inventors: Michael James Best, Newmarket (CA); Rimas Ciplijauskas, Etobicoke (CA); Changize Sadr, North York (CA); Ali Totonchian, Toronto (CA)

(73) Assignee: Salflex Polymers Ltd., Weston, Ontario (CA)

( * ) Notice: Subject to any disclaimer, the term of this patent is extended or adjusted under 35 U.S.C. 154(b) by 424 days.

(21) Appl. No.: 10/929,404

(22) Filed: Aug. 31, 2004

(65) Prior Publication Data

US 2005/0052011 A1 Mar. 10, 2005

Related U.S. Application Data

(60) Provisional application No. 60/500,234, filed on Sep. 5, 2003.

(51) Int. Cl.
*B60R 21/45* (2006.01)
(52) U.S. Cl. ...................................... 280/752
(58) Field of Classification Search ............... 280/752; 188/371, 377; 296/37.12, 187.05, 70
See application file for complete search history.

(56) References Cited

U.S. PATENT DOCUMENTS

| 5,413,379 A | 5/1995 | Koma |
| 5,482,319 A * | 1/1996 | Yoshimura et al. ......... 280/752 |
| 5,865,468 A | 2/1999 | Hur |
| 5,951,045 A | 9/1999 | Almefelt et al. |
| 5,971,461 A | 10/1999 | Vaishnav et al. |
| 6,196,588 B1 * | 3/2001 | Sugawara .................... 280/779 |
| 6,299,208 B1 | 10/2001 | Kasahara et al. |

FOREIGN PATENT DOCUMENTS

EP 0 662 902 B1 3/1996

OTHER PUBLICATIONS

NHTSA VRTC Pedestrian and Applied Biomechanics Division, Adult Crash Test Dummies,Hybridd III 50th Percentile Male, at http://www-nrd.nhtsa.dot.gov/vrtc/bio/adult/hybIII50dat.htm.*

* cited by examiner

*Primary Examiner*—Eric Culbreth
*Assistant Examiner*—Robert Coker
(74) *Attorney, Agent, or Firm*—Bereskin & Parr

(57) ABSTRACT

An instrument panel subassembly for use in an instrument panel assembly in a motor vehicle is provided. The subassembly includes first and second generally C-shaped energy absorption brackets. The brackets have an aft facing C-section and upper and lower mounting ends. The brackets include attachment means for attaching the brackets to a vehicle structural member. The subassembly further includes a glove box door having an aft surface and a forward surface, and a bin. The glove box door includes hinge means for providing hinged movement of the glove box door relative to the first and second brackets between open and closed positions. The bin is within the C-section of the brackets when the glove box door is in a hingedly closed position.

17 Claims, 8 Drawing Sheets

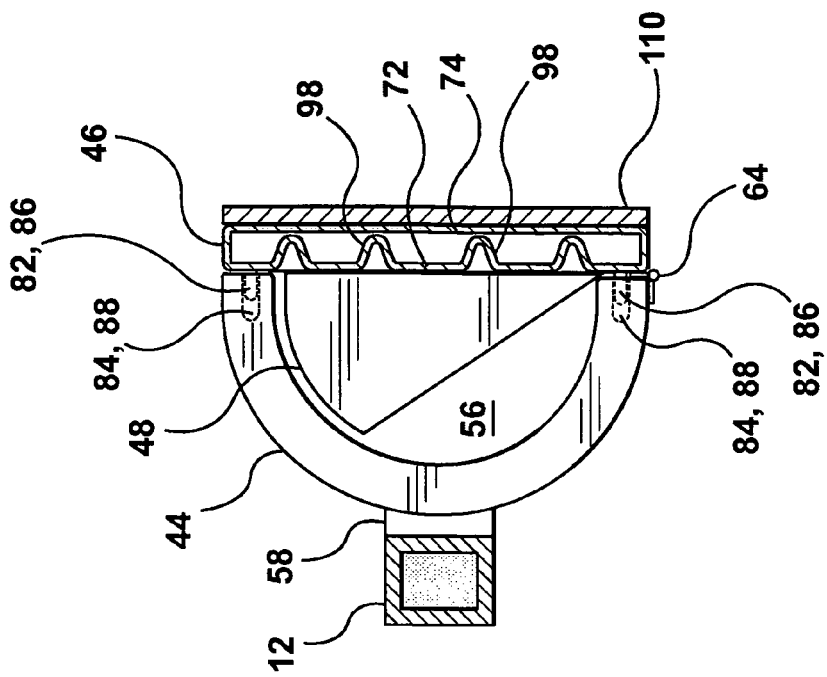
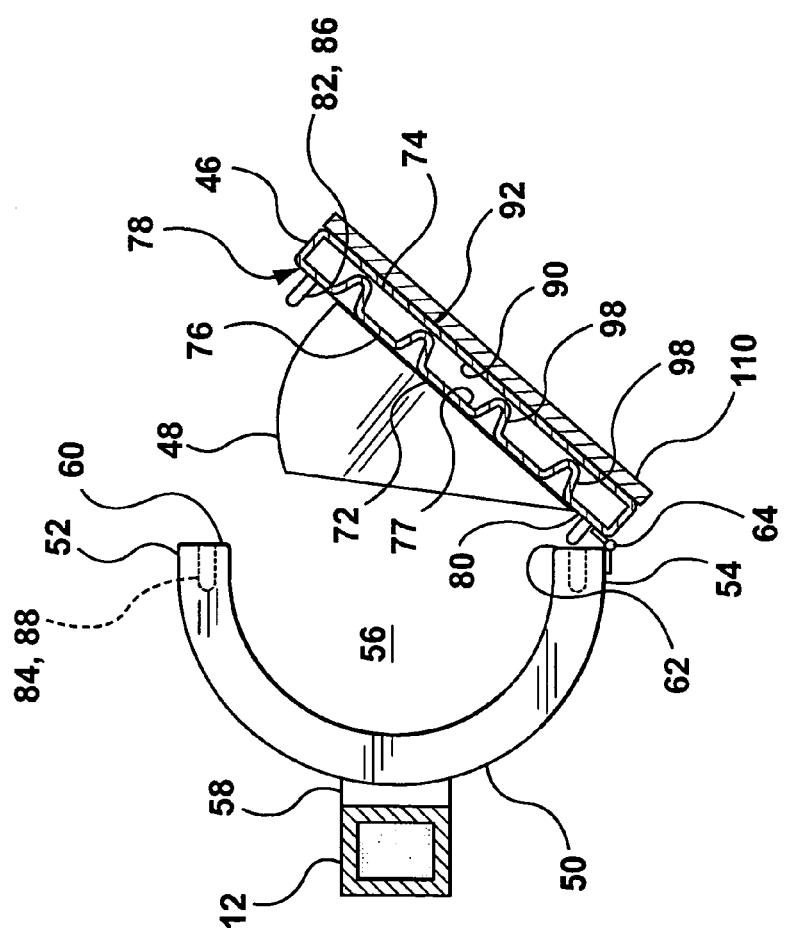

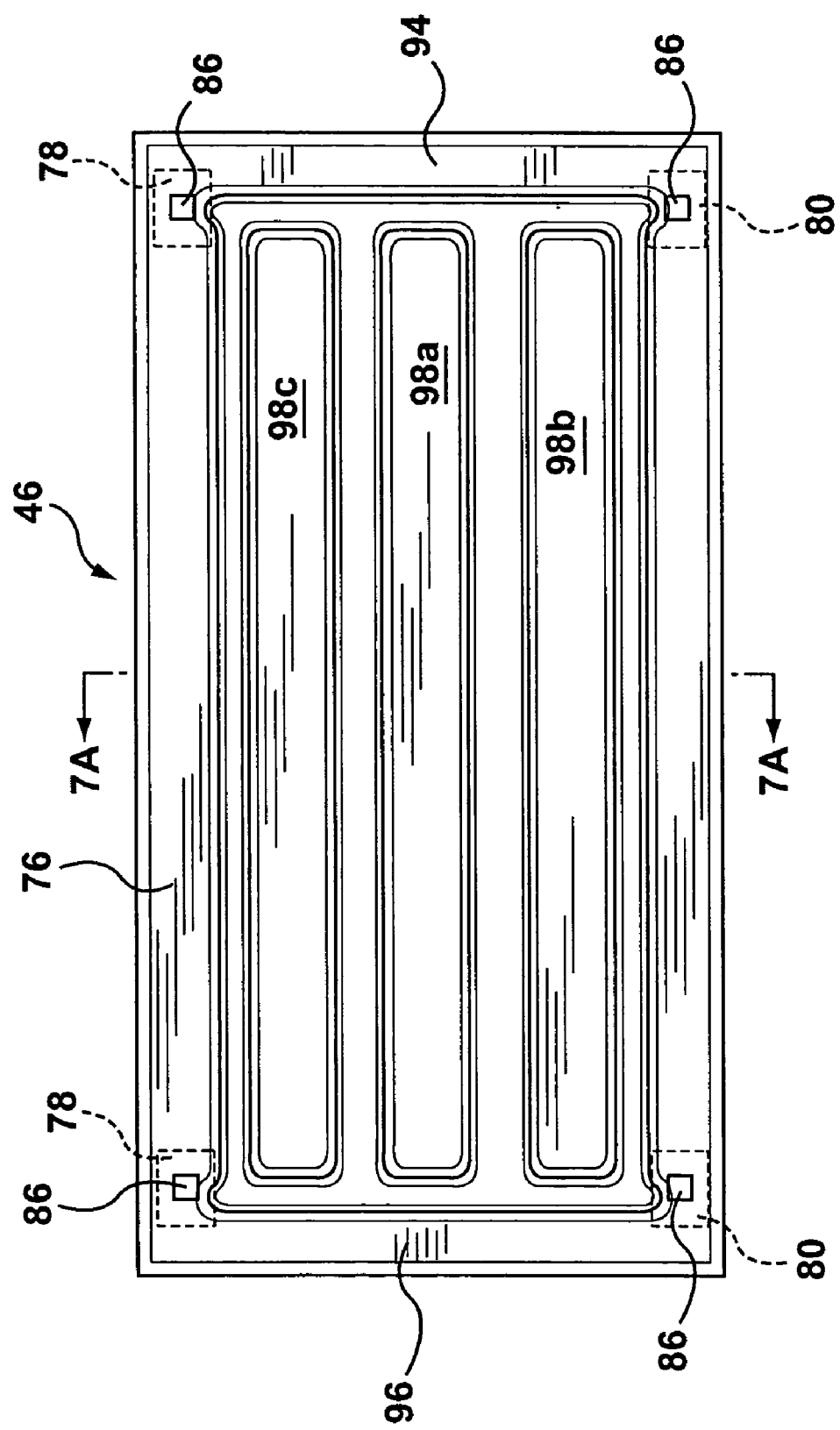

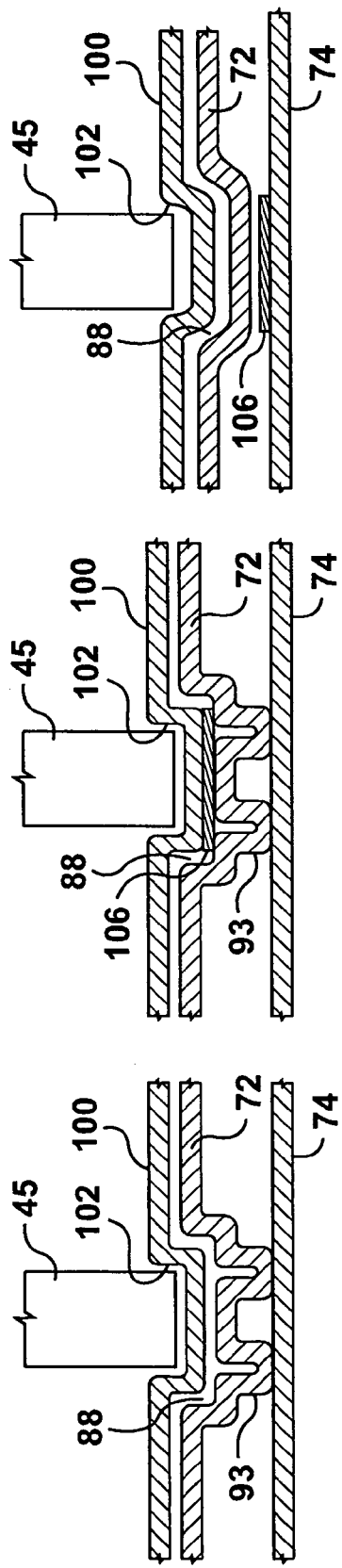
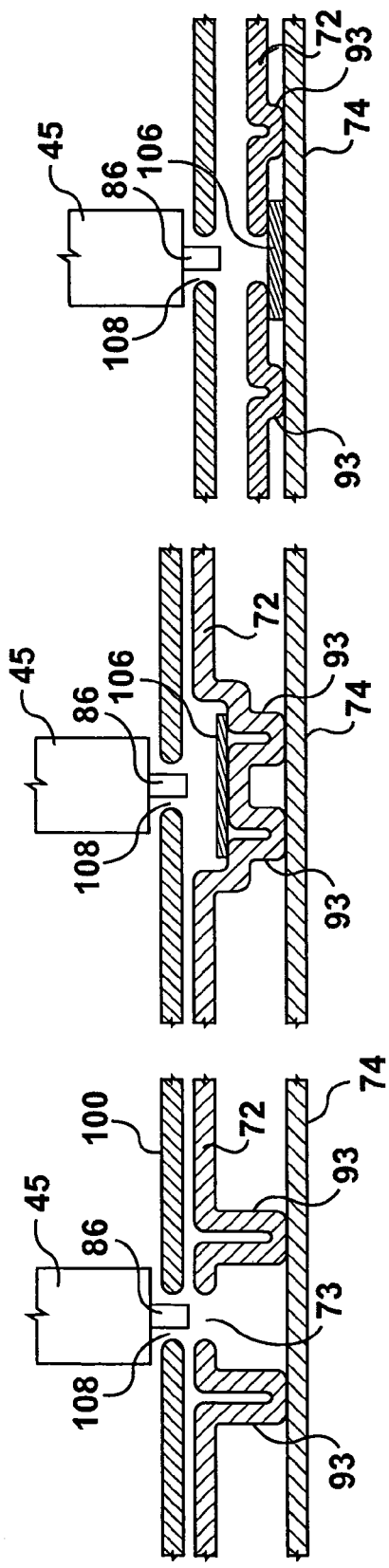

INSTRUMENT PANEL SUBASSEMBLY INCLUDING A GLOVE BOX DOOR

CROSS-REFERENCE TO RELATED APPLICATIONS

This application claims benefit from U.S. provisional application Ser. No. 60/500,234 filed Sep. 5, 2003, which is incorporated herein by reference in its entirety.

FIELD OF THE INVENTION

The invention relates to bolsters for an instrument panel for an automotive vehicle and more particularly to the bolster, which is a glove box door for an automotive vehicle.

BACKGROUND OF THE INVENTION

In the manufacture of vehicles, such as passenger cars and trucks, there are many safety standards that must be met by the vehicles to reduce the likelihood and/or severity of injury to occupants during an accident. For example, in the United States the safety standard FMVSS 208 deals with the risk of knee injury arising from contacting the vehicle instrument panel during a frontal crash. In order to meet the safety standard, portions of an instrument panel assembly are required to absorb at least some of the energy of an impact by the knees of the front seat occupants during a crash. A portion of the instrument panel that is configured to sustain an impact from the knees of a front seat occupant during a crash is called a bolster. This is the portion of the instrument panel below the belt line.

Government tests are conducted on vehicles to determine if they meet the safety standard, based on the statistically median-sized male occupant. The median size is a statistically determined size whereby 50 percent of the population is larger and 50 percent of the population is smaller.

In some vehicles, the problem of meeting this safety standard is complicated by the fact that the vehicle's glove box is positioned in the same area that is expected to be impacted by the knees of the median-sized passenger during a crash.

In order to provide a glove box in the area of expected impact and still meet the aforementioned safety standard, some manufacturers provide a glove box panel subassembly 10 as shown in FIG. 1. The subassembly 10 mounts to a cross-brace 12, which typically extends between a first A pillar 14 and a second A pillar (not shown) on a vehicle. Mounted to the cross-brace 12 are two energy absorption brackets 16 that are generally D shaped. The energy absorption brackets 16 are designed to deform to absorb energy from an impact from the passenger's knees during a crash. By absorbing the impact energy, the passenger is less likely to incur severe knee injury. Furthermore, the severity of any leg injury resulting from impact with the glove box portion of the instrument panel is reduced.

Reference is made to FIGS. 2a and 2b. The energy absorption brackets 16 are essentially D-shaped with a forward portion 18, which is generally C-shaped, and an aft portion 19, which is generally straight.

The energy absorption brackets 16 extend rearward from the cross-brace 12. In general, 'forward' refers to the direction towards the front of the vehicle from a point inside the vehicle, and 'rearward' or 'aft' refer to the direction towards the rear of the vehicle from a point inside the vehicle.

A glove box door 20 having a bottom edge 21 is typically hingedly mounted for movement relative to the energy absorption brackets 16 between an open and a closed position.

The glove box door 20 has a forward face 22 and an aft face 24. A storage bin 26 is attached to the forward face 22. The glove box door 20 moves between an open position, as shown in FIG. 2a, and a closed position, as shown in FIG. 2b. In the open position (FIG. 2a), the storage bin 26 may be filled with miscellaneous articles. In the closed position (FIG. 2b), the forward face 22 of the glove box door 20 is in close proximity to the energy absorption brackets 16. During a crash, the impact energy from the passenger's knees on the glove box door 20 is transferred to the energy absorption brackets 16 through straight aft portions 19, and is absorbed by the energy absorption brackets 16.

Referring to FIG. 1, the glove box door 20 is typically made from a polymeric material and is injection molded. The injection molding process can itself negatively affect the strength of the plastic material. Thus, the glove box door 20 is typically not considered to be capable of sustaining a substantial portion of the load that results from an impact by the passenger's knees during a crash. Although injection molded pieces have good appearance characteristics, they do not usually have much strength and thus require additional strengthening such as metal plates or wide contact areas with the brackets.

In order to absorb the impact energy from the passenger's knees, the energy absorption brackets 16 are typically positioned so that they are each positioned to be directly in line with the expected position of the knee of the median-sized passenger when the instrument panel is impacted by the passenger's knee during a crash. As a result, the distance "W" between the energy absorption brackets 16 is determined by the distance between the knees of the median-sized passenger.

As a result of the close proximity between the energy absorption brackets 16 and the glove box door 20, the storage bin 26 cannot extend along the portions of the forward face 22 of the glove box door 20 which lie adjacent the energy absorption brackets 16. Thus, the storage bin 26 is divided into a primary bin 28 and a secondary bin 30. The size of the primary bin 28 is limited such that it has a width that is less than "W" so as not to interfere with the position of the energy absorption brackets 16. The secondary bin 30 may be provided but is typically only capable of holding small articles. In general, the storage capacity and the usefulness of the bins 28 and 30 are compromised by the presence of the energy absorption brackets 16.

The aft face 24 of the glove box door 20 faces the occupants of the vehicle and may be covered by an aft layer 32, which is provided in accordance with the design of the rest of the interior viewable surfaces of the vehicle.

There is a need for an improved instrument panel subassembly for passenger vehicles that at least partially resolves the problems described above.

SUMMARY OF THE INVENTION

In accordance with the invention, an instrument panel sub assembly for use in an instrument panel assembly of a motor vehicle comprises first and second generally C-shaped energy absorbing brackets. The brackets have an aft facing C-section and upper and lower mounting ends. The brackets include attachment means for attaching the brackets to a vehicle structural member. The sub assembly further includes a glove box door, the glove box door having an aft surface and a forward surface. The sub assembly further includes a bin. The glove box door has hinge means for providing hinged movement of the glove box door relative to the first and second brackets between open and closed positions. In the sub assembly, the bin is located within the C-section of the brackets when the glove box door is in a hingedly closed position.

In a preferred embodiment of the invention, the glove box door comprises a blow molded component having an aft wall and a forward wall, the aft wall defining the aft surface and the forward wall defining the forward surface.

In accordance with a further aspect of the invention, the energy absorbing brackets are laterally spaced a distance "W" and the bin has a lateral width of at least "W" and preferably a lateral width greater than W.

In accordance with a further aspect of the invention, the upper and lower mounting ends of each energy absorption bracket define respective upper and lower bracket contact zones for contact by the glove box door and the glove box door includes two upper, glove box door contact zones and two lower, glove box door contact zones for contact by the brackets and the glove box door contact zones are located to interact with the bracket contact zones to transfer forces applied to the aft face of the glove box door to the brackets.

In accordance with another aspect of the invention, the subassembly includes strengthening means for structurally supporting the aft facing surface of the glove box door so that forces applied to the aft facing surface are transferred to the mounting ends of the energy absorption brackets without substantial deformation of the glove box door.

In one preferred embodiment of the invention, the subassembly includes crushable rib structures in the glove box door for absorbing energy from a force applied to the aft facing surface of the glove box door.

BRIEF DESCRIPTION OF THE DRAWINGS

For a better understanding of the present invention and to show more clearly how it may be carried into effect, reference will now be made by way of example to the accompanying drawings, in which:

FIG. 4a is a sectional side view of the instrument panel subassembly shown in FIG. 3, showing a glove box door in an open position;

FIG. 4b is a sectional side view of the instrument panel subassembly shown in FIG. 3, showing a glove box door in a closed position;

FIG. 6 is a frontal view of the front surface of the glove box door of FIG. 3;

FIGS. 7b and 7c are partial cross-sectional views of alternate rib structures similar to that shown in FIG. 7a;

FIGS. 8a, 8b, 8c, 8d, 8e and 8f are cross-sectional views of alternate embodiments showing the interaction of the components of the embodiment of the invention illustrated in FIG. 3.

DETAILED DESCRIPTION OF THE INVENTION

Figure 3:
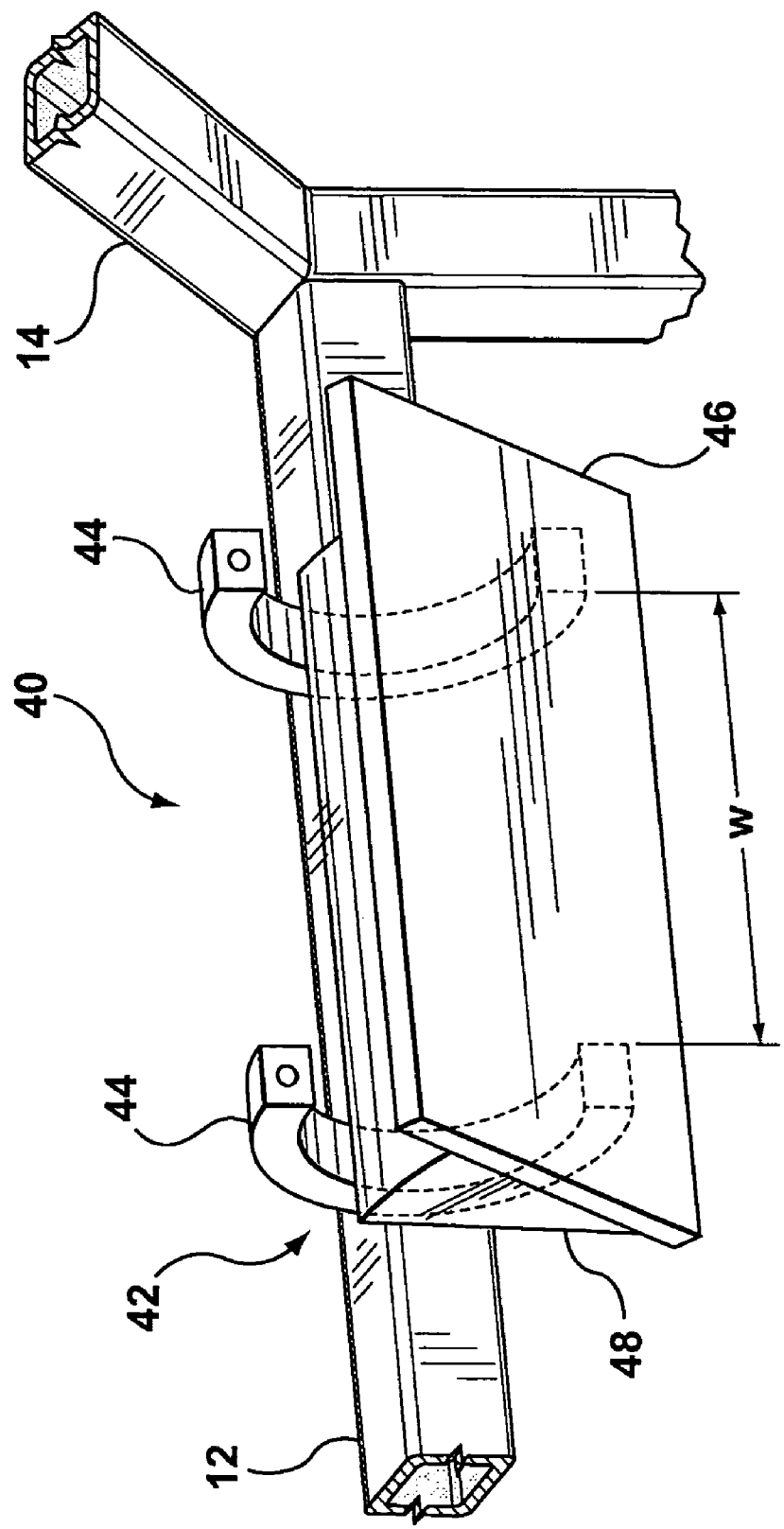
FIG. 3 is a perspective view of a portion of a vehicle including an instrument panel subassembly in accordance with a first embodiment of the present invention.

Reference is made to FIG. 3, which shows a portion of a vehicle including an instrument panel subassembly 40 in accordance with a first embodiment of the present invention. The instrument panel subassembly 40 includes a glove box 42 for storage of miscellaneous articles and provides injury protection for the knees of the passenger-side occupant of the vehicle. The subassembly 40 includes a pair of energy absorption brackets 44, a glove box door 46, also called a bolster, and a storage bin 48.

Reference is made to FIG. 4a. The energy absorption brackets 44 are configured to absorb energy from an impact from a passenger's knee during a crash, such as a frontal crash. The energy absorption brackets 44 may be generally C-shaped in profile. As such, the energy absorption brackets 44 each have a generally convex forward face 50, and upper and lower mounting ends 52 and 54. The energy absorption brackets 44 each define a generally C-shaped interior volume 56.

An attachment means 58 is provided on the forward face 50 of each energy absorption bracket 44. The attachment means 58 may be any means that permits the energy absorption bracket 44 to be attached to a structural member of the vehicle, such as the cross-brace 12. For example, the attachment means 58 may be a planar portion that is formed into the forward face 50 of each energy absorption bracket 44. The planar portion permits easy positioning against the cross-brace 12 for welding thereto.

The upper and lower mounting ends 52 and 54 define upper and lower bracket contact zones 60 and 62 thereon respectively. The upper and lower contact zones 60 and 62 are intended to contact the glove box door 46 during normal use as more fully explained below.

The glove box door 46 includes a hinge 64, which enables the glove box door 46 to move between an open position shown in FIG. 4a to a closed position shown in FIG. 4b relative to the energy absorption brackets 44.

The glove box door 44 may be hingedly attached to any convenient structure of the instrument panel assembly including the energy absorbing brackets 44 or to other surrounding structure.

The glove box door 46 has a forward wall 72, and an aft wall 74, which is spaced from the forward wall 72. The forward wall 72 has a forward surface 76 and a forward wall aft surface 77. The forward surface 76 faces the interior volume 56 of the energy absorption brackets 44 and abuts the upper and lower contact zones 60 and 62 of the energy absorption brackets 44. On the forward surface 76 there are two upper, glove box door contact zones 78 and two lower glove box door contact zones 80, which are portions of the forward surface 76. The upper and lower glove box door contact zones 78, 80, the upper and lower bracket contact zones 60 and 62, on the energy absorption brackets are located to interact and form respective inter-working sets of contact zones 82, 84, one inter-working zone on a bracket and one inter-working zone on the glove box door. Each set of inter-working zones may include at least one pin member 86 and at least one pocket member 88. The pin members may be located on the glove box door 46 as shown in FIGS. 4a and 4b.

Figure 5:
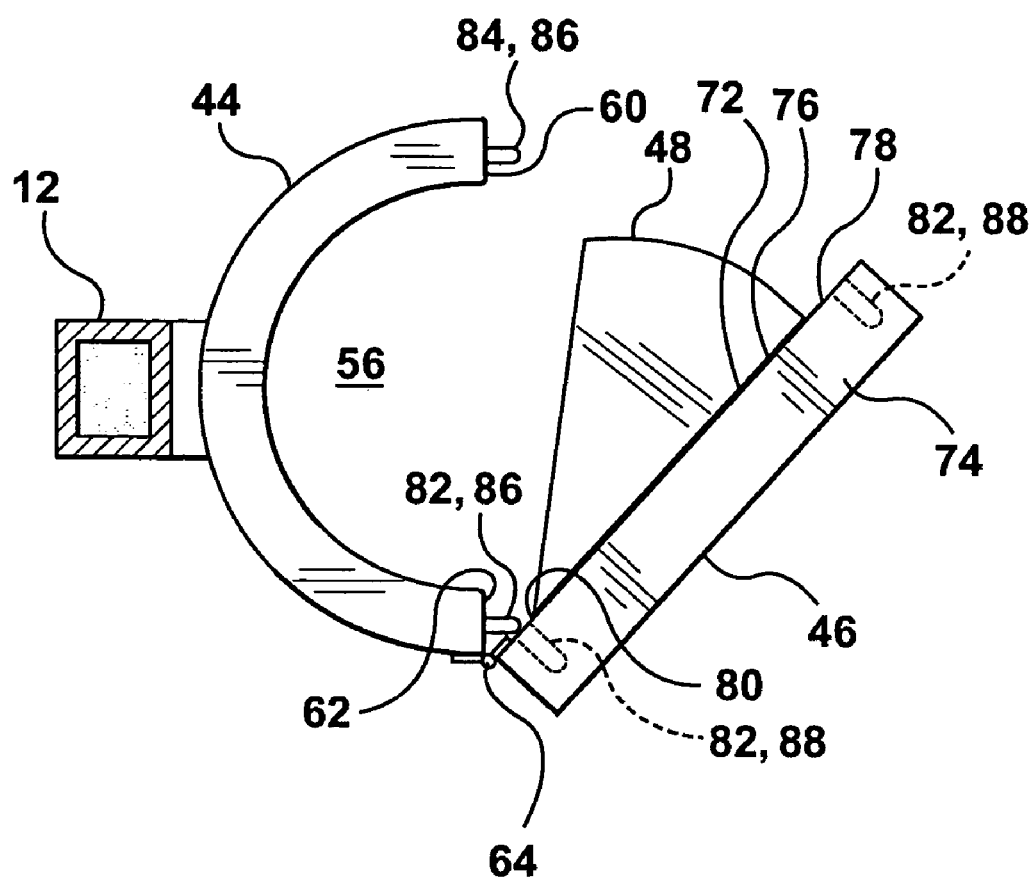
FIG. 5 is a sectional side view of a variant of a portion of the instrument panel subassembly shown in FIG. 3.

Referring to FIG. 5, an alternative is shown to the embodiment shown in FIGS. 4a and 4b. In this alternative embodiment, the pin members 86 may be positioned on the bracket contact zones 60 and 62 of the energy absorption brackets 44, and may engage pockets 88 positioned on the forward surface 76 of the glove box door 46. The interworking sets of contact zones may alternatively be any other suitable structure for transferring forces from the glove box door 46 to the energy absorption brackets 44 in a stable fashion.

Referring to FIGS. 4a and 4b, the second wall 74 is spaced from the forward wall 72. The aft wall 74 has an aft wall forward surface 90 and an aft wall aft surface 92.

Preferably the glove box door 46 may be made from any suitable material such as a polymeric material and most preferably the glove box door is made by a blow molding process. The blow molding process is a particularly cost advantageous way of making a structure having a forward wall 72 and an aft wall 74. During the blow molding process, a parison is extruded. The parison is then enclosed within a set of mold halves and expanded against the cavities within the mold halves. The cavities define the configuration of the outer surface of the parison. In this case the outer surface of the parison will contour the forward surface 76 of the forward wall 72 and the aft surface 92 of the second wall 74. The mold halves of the blow mold may include projections, which are fixed and force the parison into various configurations. Alternatively, the mold may have a number of moving parts, which can also position the parison as desired.

Figure 7A:
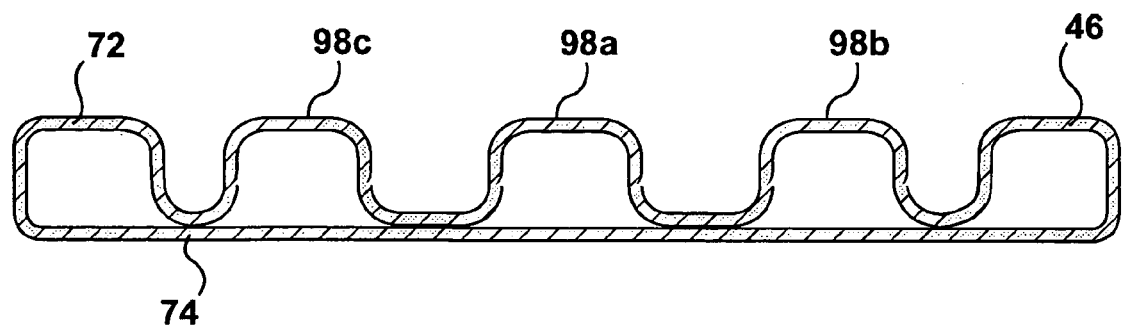
FIG. 7a is a sectional view of a portion of the glove box door of FIG. 6.
Figure 7B:
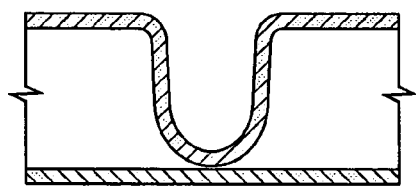
Figure 7C:
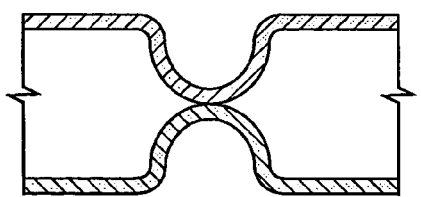
Figure 7D:
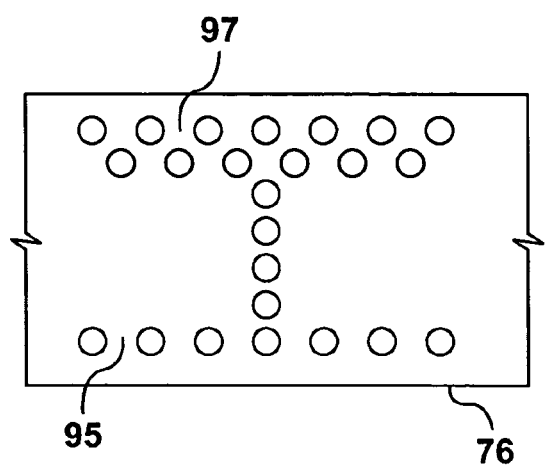
FIG. 7d is a frontal view of a component having rib structures as shown in FIGS. 7b and 7c.

When blow molding objects, the completed object is an enclosed hollow structure which, in cross-section, appears to have first and second walls. Where it is desired to significantly strengthen the resulting hollow structure, the parison can be manipulated so that the two walls come into contact with each other. Thus, upon molding of parison, the finished product can have one or more continuous ribs as shown in FIG. 7a. It is also possible within the blow molding process to create a dimple, which may be essentially a recess rather than a longitudinally extending member. The recess may be formed by bringing one wall of the parison into the plane of the other wall of the parison as shown in FIG. 7b in which case the recess is apparent on one face only of the finished product or alternatively the recesses may be formed in each face of the finished product as shown in FIG. 7c. The molding of the parison is in the form of continuously extending ribs or one or more dimples. The dimples may be arranged in longitudinal rows as shown in FIG. 7d. The rows may include one row of dimples as shown at 95 or multiple arrangements of dimples as shown at 97. In this disclosure and in the claims, all such strengthening means that include single rows of dimples, multiple rows of dimples or continuously extending ribs are hereinafter collectively referred to as rib structures.

As shown in FIG. 6, glove box door 46 includes at least one first rib structure 94, which extends from adjacent a first upper glove box door contact zone 78 to adjacent a first lower glove box door contact zone 80. This first rib structure 94 thus comprises a generally vertically oriented strengthening member which will provide bending strength to limit bending of the glove box door about a generally horizontal plane between the upper glove box contact zones and the lower contact zones.

Advantageously, the glove box door also includes a second rib structure 96 extending from adjacent the second upper glove box door contact zone 78 to adjacent the second lower glove box door contact zone 80. This provides additional bending strength in the same direction and helps transfer loads from the glove box door in the vertical direction toward the contact zones 78 and 80.

Most advantageously, the glove box door 46 includes at least one third rib structure 98 extending generally laterally of the glove box door from adjacent the first rib structure 94 to adjacent the second rib structure 96. The third rib structure 98 may be generally centrally located as shown at 98a, may be above or below the first and second rib structures 94, 96 as shown at 98b or may be adjacent the first and second rib structures 94, 96 as shown at 98c. While FIG. 6 illustrates two vertically acting rib structures 94 and 96 and three horizontal acting rib structures 98a, 98b and 98c, within the blow molding technology, any number of rib structures can be provided so that the final blow molded product has the requisite strength to act as a beam.

In use, the knees of the occupant will contact the glove box door. The knees may strike the glove box door directly in alignment with the first rib structure 94 and the second rib structure 96, in which case the force of the impact will be distributed by those rib structures to the upper and lower contact zones. However, it is always possible, depending upon the location of the occupant's knees when the vehicle rapidly decelerates, that one or both of the knees of the occupant may strike the glove box door at some place other than in direct alignment with rib structures 94 and 96. In such an event, the load is transferred to the rib structures 98 and from those rib structures 98 to the rib structures 94 and 96 and from there to the upper and lower glove box door contact zones. The load then passes from the upper and lower glove box door contact zones to the upper and lower bracket contact zones where the energy may be dissipated by the energy absorbing brackets 44.

While the above-explained force transfer mechanism contemplates that all energy will be dissipated in the energy absorbing brackets 44, it is possible, to include other collapsible dimple structures that are intended to collapse and permit movement of the aft wall 74 toward the forward wall 72. In permitting the relative movement between the walls 72 and 74, additional energy dissipation can be achieved.

While FIG. 6 shows that the rib structures 94, 96 are essentially vertically oriented and rib structures 98 are essentially horizontally oriented, the orientation of the rib structures may be altered to suit the vehicle structure or other design needs. Within the context of the invention, it is not necessary that upper contact zones 78 be oriented vertically above lower contact zones 80. This arises simply from the usual configuration of the energy absorption brackets. However, if for some reason those brackets are not vertically oriented, then the glove box door may be designed to interwork with wherever are the locations of the energy absorbing bracket contact zones. Thus the rib structures 94, 98 could extend at right angles to each other or at 45° to each other or at any other convenient angle. Basically the rib structures 94, 96, 98 as depicted operate to provide the necessary bending strength about horizontal planes and vertical planes so that the impact load is transferred to the upper and lower contact zones wherever they may be located and wherever the knees are located. As shown in FIG. 6, the upper and lower contact zones are essentially adjacent the upper and lower corners of the glove box door 46. However, within this invention, the glove box may be made considerably wider than the energy absorbing brackets if other instrument panel structure permits and thus the invention contemplates that there is no limitation upon the lateral extent or vertical height of the glove box door, this being governed by other instrument panel spacing requirements.

When the forces are transferred from the glove box door 46 to the energy absorption brackets, it is preferable that there be included some means of stabilizing the energy or force transfer in the lateral and vertical directions. While the rib structures of the glove box door transfer the forces to the glove box door contact zones, it is possible that the glove box door contact zones may not remain aligned with the bracket contact zones. In order to keep the interworking set of contact zones in alignment, it is preferable to include a pin and pocket mechanism as explained above. FIGS. 8a through 8f show various cross-sectional structures in which, for illustration purposes, the contact zone of the energy absorbing bracket is shown in cross-section as a rectangular member 45. Also in each case, the glove box door 46 is shown as including a forward liner member 100 which may be the wall of the bin 48, which may be affixed to the forward surface of the glove box door.

As shown in FIG. 8a, the glove box door liner or bin wall 100 includes a pocket 102, which closely accepts one of the mounting ends 45. The forward wall 72 also includes a pocket 88, which receives the pocket 102 of the glove box door liner 100. As shown in FIG. 8a, the pocket 88 is formed in wall 72 by creating a rib structure 93, which includes two structures that are brought into contact with the interior surface of the wall 74 to help form a rib structure 73 immediately aligned with the pocket 88.

FIG. 8b is similar to FIG. 8a except that in FIG. 8a, a steel insert 106 has been included between the glove box door liner 100 and the wall 72 of the glove box 46. The steel liner 106 may be a square piece of steel approximately one inch square, a rectangular piece of steel perhaps one by two inches or for that matter could be a vertically extending bar, which extends the full height of the distance between the mounting ends of one of the energy absorption brackets 44. As shown in FIG. 8b, the steel insert 106 may be affixed to either the glove box door 46 or the glove box door liner 100 prior to their relative assembly.

FIG. 8c is somewhat similar except that in this case, the forward wall 72 includes a slight depression 88, which receives the pocket 102 of the glove box door liner 100. In this case, the pocket 88 does not extend aft to contact the interior surface of the aft wall 44. In this case, a steel liner 106 is inserted within the parison at an appropriate time so that the steel liner is between the now closely spaced walls 72 and 74. Thus, as wall 74 moves relative to wall 72 on impact, the force is transmitted to the steel liner 106 and from there to the wall 72, the glove box door liner 100 and then the energy absorbing bracket 45.

FIG. 8d illustrates another optional stabilization means. In this figure, the inner glove box door liner 100 includes an aperture 108, which accepts a pin member 86 on the energy absorption bracket 45. In this case, the forward wall 72 also includes an aperture 73 into which the pin 86 may pass when the glove box door is forced against the energy absorption bracket. As shown in FIG. 8d, the glove box door includes a rib structure 93 in the vicinity of the contact zone.

FIG. 8e is similar to FIG. 8d except that in this case, the forward wall 72 is configured to comprise a rib structure 93 and the rib structure 93 also includes a metallic reinforcement plate 106.

FIG. 8f shows a further embodiment in which the rib structures 93 of the glove box door 46 include rib structures laterally on either side of the energy absorption bracket 45 and with an insert 106 aligned with the energy absorption bracket 45.

The storage bin 48 is shown mounted on the forward face 76 of the first wall 72. Alternatively, the storage bin need not be mounted to the glove box door. The bin could be a stationary bin mounted to another instrument panel structure. In either case, the storage bin 48 may extend along substantially the entire length of the forward face 76. More particularly, the storage bin 48 may pass through the interior volume 56 defined by the C-shaped energy absorption brackets 44. The reason that the storage bin 48 is permitted to pass through the interior volume 56 is that the energy absorption brackets 44 are C-shaped and lack a vertically extending bar on their aft ends. Instead, structures, such as the vertically extending ribs 94 and the connection means 82, that are part of the glove box door 46 itself, provide a similar function to the vertically extending bars 19 by cooperating with the C-shaped energy absorption brackets 44.

Figure 1:
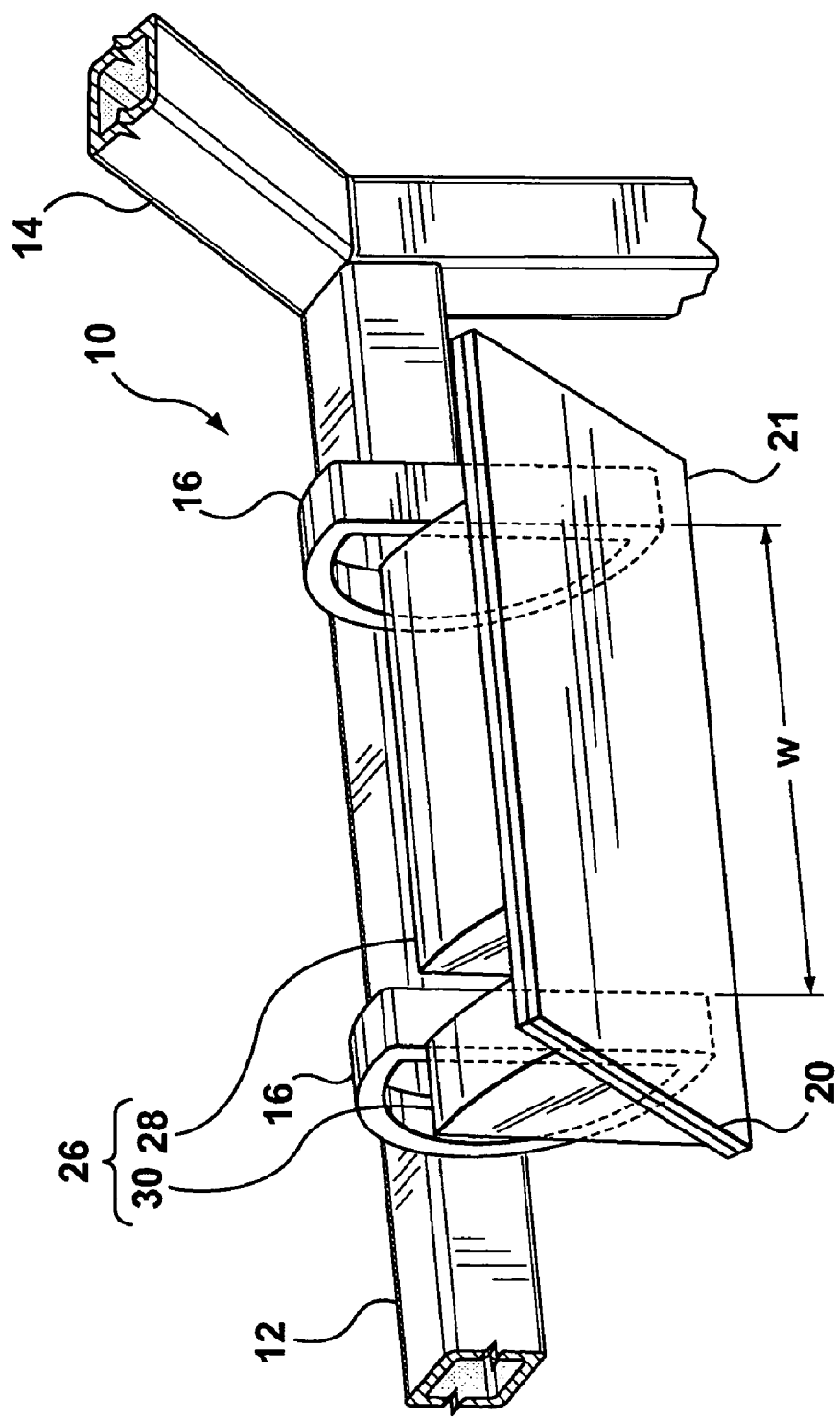
FIG. 1 is a perspective view of a portion of a vehicle including an instrument panel subassembly of the prior art.
Figure 2B:
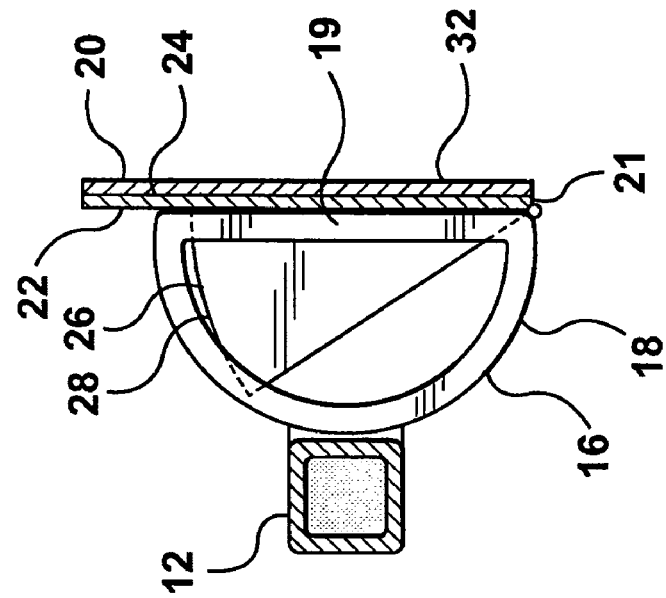
FIG. 2b is a sectional side view of the instrument panel subassembly shown in FIG. 1, showing a glove box door in a closed position.
Figure 2A:
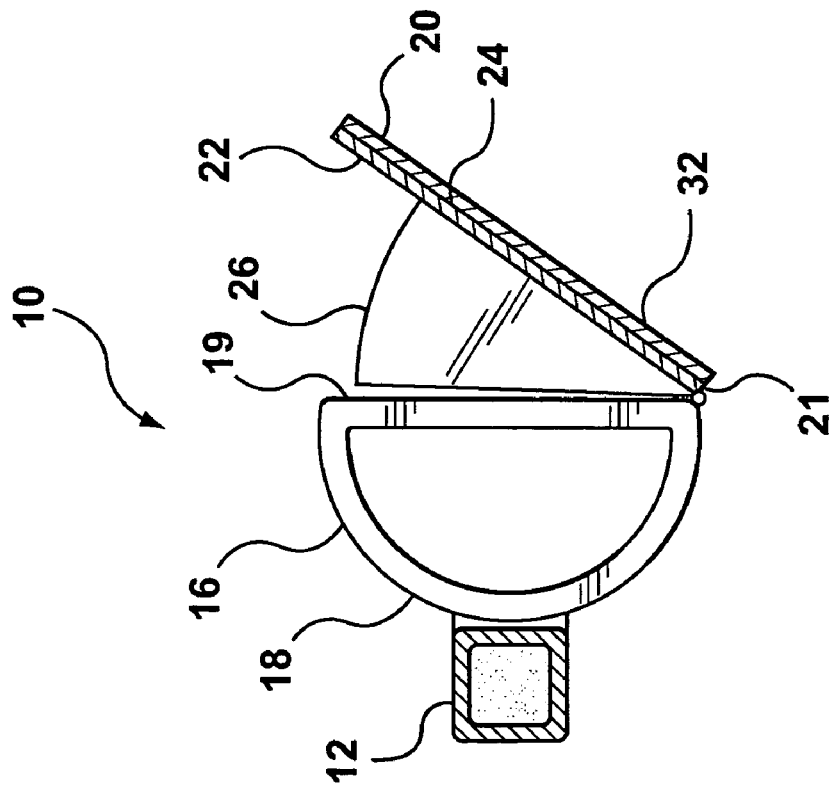
FIG. 2a is a sectional side view of the instrument panel subassembly shown in FIG. 1, showing a glove box door in an open position.

The lateral length of the storage bin 48 is not constrained by the distance W between the energy absorption brackets 44. Thus, the storage bin 48 may have a length that is less than, equal to, or greater than the distance W. Thus, the storage bin 48 may be made larger than the storage bins 28 or 30 of the subassembly 10 shown in FIG. 1. As a result, the storage bin 48 can be made to store larger articles than the storage bins 28 or 30 of FIG. 1.

A fascia 110 may be mounted to the aft surface 92 of the second wall 74 of the glove box door 46. The fascia 110 is provided to match the design of the rest of the interior viewable surfaces of the vehicle. The fascia 110 may be made by any method, such as by injection molding.

While the above description constitutes the preferred embodiments, it will be appreciated that the present invention is susceptible to modification and change without departing from the fair meaning of the accompanying claims.

The invention claimed is:

1. An instrument panel subassembly for use in an instrument panel assembly in a motor vehicle comprising
first and second generally "C" shaped energy absorption brackets,
said brackets having an aft facing "C" section, and upper and lower mounting ends;
said brackets including an attachment portion for attaching said brackets to a vehicle structural member;
said subassembly further including a glove box door, said glove box door having an aft surface and a forward surface, and a bin, said glove box door including a hinge for providing hinged movement of said glove box door relative to said first and second brackets, between open and closed positions;
wherein said bin is within said "C" section of said brackets when said glove box door is in a hingedly closed position,
wherein said "C" shaped brackets are spread laterally apart by a distance "W",
and wherein said bin has a lateral width of greater than "W".

2. The subassembly of claim 1 wherein said glove box door comprises a blow molded component having aft and forward walls, said aft wall defining said aft surface, said forward wall defining said forward surface.

3. The subassembly of claim 1 wherein said bin is attached to said glove box door.

4. The subassembly of claim 1 wherein the upper and lower mounting ends of each said bracket defines respective upper and lower bracket contact zones for contact by said glove box door.

5. The subassembly of claim 4 wherein said glove box door includes two upper glove box door contact zones and two lower glove box door contact zones for contact by said brackets, and wherein said glove box door contact zones are located to interact with said bracket contact zones to transfer forces applied to said aft face of said glove box door to said brackets.

6. The subassembly of claim 5 wherein said contact zones of said brackets and said contact zones of said glove box door form respective inter-working sets of contact zones.

7. The subassembly of claim 6 wherein each said inter-working set of contacting zones includes at least one pocket member and at least one pin member.

8. The subassembly of claim 7 wherein said pin member is on said bracket and said pocket member is on said glove box door.

9. The subassembly of claim 7 wherein said pin member is on said glove box door and said pocket member is on said bracket.

10. The subassembly of claim 6 wherein said glove box door includes at least one first rib structure extending from adjacent a first upper glove box door contact zone to adjacent a first lower glove box door contact zone.

11. The subassembly of claim 10 wherein said glove box door includes a second rib structure extending from adjacent a second upper glove box door contact zone to adjacent to a second lower glove box door contact zone.

12. The subassembly of claim 11 wherein said glove box door includes at least one third rib structure extending generally laterally of said glove box door from adjacent to said first rib structure to adjacent said second rib structure.

13. The subassembly of claim 12 wherein said glove box door includes a plurality of said third rib structures.

14. The subassembly of claim 1 wherein the length "W" is selected to be equal to the distance between knee impact zones of the statistically median-sized male occupant.

15. The subassembly of claim 1 wherein said glove box door includes strengthening means for structurally supporting said aft surface so that forces applied to said aft surface are transferred to said mounting ends without substantial deformation of said glove box door.

16. The subassembly of claim 15 wherein said glove box door includes crushable rib structures for absorbing energy from a force applied to said aft surface.

17. An instrument panel subassembly for use in an instrument panel assembly in a motor vehicle comprising:

first and second generally "C" shaped energy absorption brackets, said brackets having an aft facing "C" section, and upper and lower mounting ends;

said brackets including attachment means for attaching said brackets to a vehicle structural member;

said subassembly further including a glove box door, said glove box door having an aft surface and a forward surface, and a bin, said glove box door including hinge means for providing hinged movement of said glove box door relative to said first and second brackets, between open and closed positions;

and wherein said bin is within said "C" section of said brackets when said glove box door is in a hingedly closed position;

and wherein said glove box door comprises a blow molded component having aft and forward walls, said aft wall defining said aft surface, said forward wall defining said forward surface;

and wherein said "C" shaped brackets are spread laterally apart by a distance "W";

and wherein said bin has a lateral width of greater than "W".

* * * * *